US008122486B2

(12) United States Patent
West

(10) Patent No.: US 8,122,486 B2
(45) Date of Patent: Feb. 21, 2012

(54) METHOD AND SYSTEM FOR SECURE MANAGEMENT OF CO-LOCATED CUSTOMER PREMISES EQUIPMENT

(75) Inventor: Thomas J. West, Blue Springs, MO (US)

(73) Assignee: Embarq Holdings Company LLC, Overland Park, KS (US)

( * ) Notice: Subject to any disclaimer, the term of this patent is extended or adjusted under 35 U.S.C. 154(b) by 801 days.

(21) Appl. No.: 12/100,112

(22) Filed: Apr. 9, 2008

(65) Prior Publication Data

US 2009/0260059 A1 Oct. 15, 2009

(51) Int. Cl.
 G06F 7/04 (2006.01)
 G06F 17/30 (2006.01)
 G06F 15/16 (2006.01)
 H04L 29/06 (2006.01)
 H04N 7/16 (2006.01)
 G06F 15/177 (2006.01)
 G06F 15/173 (2006.01)

(52) U.S. Cl. ............... 726/3; 726/2; 726/26; 713/150; 709/220; 709/223; 709/224; 709/225

(58) Field of Classification Search .................. None
 See application file for complete search history.

(56) References Cited

U.S. PATENT DOCUMENTS

| 6,971,029 | B1* | 11/2005 | Avery, IV et al. | 726/26 |
|---|---|---|---|---|
| 7,200,655 | B2* | 4/2007 | Hunt et al. | 709/223 |
| 7,643,890 | B1* | 1/2010 | Hillen et al. | 700/17 |
| 2005/0220180 | A1* | 10/2005 | Barlev et al. | 375/222 |

* cited by examiner

Primary Examiner — Shin-Hon Chen

(57) ABSTRACT

A method, system, and apparatus for managing customer premise equipment according to one embodiment includes establishing a secure connection between a first transport unit and a second transport unit. The secure connection includes an embedded operations channel and is operable to isolate a management plane from a data plane. The method further includes the first transport unit receiving a request for access to the first transport unit from the second transport unit. The method further includes establishing a secure terminal session between the first transport unit and the second transport unit using the embedded operations channel in response to receiving the request for access. The first transport unit then receives a management command from the second transport unit and the first transport unit performs at least one management function in response to receiving the management command.

15 Claims, 3 Drawing Sheets

METHOD AND SYSTEM FOR SECURE MANAGEMENT OF CO-LOCATED CUSTOMER PREMISES EQUIPMENT

BACKGROUND

Copper bonding is a copper-based broadband system that allows broadband data services to be provided to customers without requiring replacement of an existing copper wire plant between a central office and customer premises. Bonding is performed by combining multiples of existing copper wire pairs together to form one or more higher bandwidth bonded connections capable of supporting greater data rates than that of a single copper pair. Copper bonding solutions require a transport unit to be co-located at a customer premises to support the bonded connection. A problem with existing installations of equipment co-located at a customer premises is that of providing out-of-band operations support systems (OSS) support while still maintaining a trusted environment. Further, it is difficult to prevent access to the management plane of the co-located equipment from unauthorized users while still enabling access to the equipment by a craftsman. For example, a craftsman may need to check the equipment to insure correct operation. It is difficult to provide this access while still maintaining a secure environment.

SUMMARY

Embodiments of the invention provide for greater security of equipment installed at customer premises by providing for a trusted management plane attachment and control of customer premise equipment or other co-located devices without jeopardizing corporate risk management policies. In various embodiments of the invention, access to equipment, such as transport units, co-located at the customer premises can be granted while still preventing access to the management plane by unauthorized users. Embodiments of the invention allow a service provider to provide secure OSS on customer premise co-located devices.

A method for managing customer premise equipment according to one embodiment includes establishing a secure connection between a first transport unit and a second transport unit. The secure connection includes an embedded operations channel and is operable to isolate a management plane from a data plane. The method further includes the first transport unit receiving a request for access to the first transport unit from the second transport unit. The method further includes establishing a secure terminal session between the first transport unit and the second transport unit using the embedded operations channel in response to receiving the request for access. The first transport unit then receives a management command from the second transport unit and the first transport unit performs at least one management function in response to receiving the management command.

A first transport unit according to one embodiment includes a processor(s) operable to establish a secure connection including an embedded operations channel with a second transport unit. The secure connection is operable to isolate a management plane from a data plane. The at least one processor is further operable to receive a request for access from the second transport unit, and establish a secure terminal session with the second transport unit using the embedded operations channel in response to receiving the request for access. The at least one processor is further operable to receive a management command from the second transport unit, and perform at least one management function in response to receiving the management command.

A computer usable program product in a computer readable medium according to one embodiment stores computer executable instructions for managing customer premise equipment that, when executed, cause a processor(s) to establish a secure connection between the first transport unit and a second transport unit. The secure connection includes an embedded operations channel and is operable to isolate a management plane from a data plane. The computer executable instructions further cause the first transport unit to receive a request for access to the first transport unit from the second transport unit. The computer executable instructions further cause the processor to establish a secure terminal session between the first transport unit and the second transport unit using the embedded operations channel in response to receiving the request for access. The computer executable instructions further cause the processor to receive, at the first transport unit, a management command from the second transport unit. The computer executable instructions further cause the first transport unit to perform at least one management function in response to receiving the management command.

DETAILED DESCRIPTION

Figure 1:
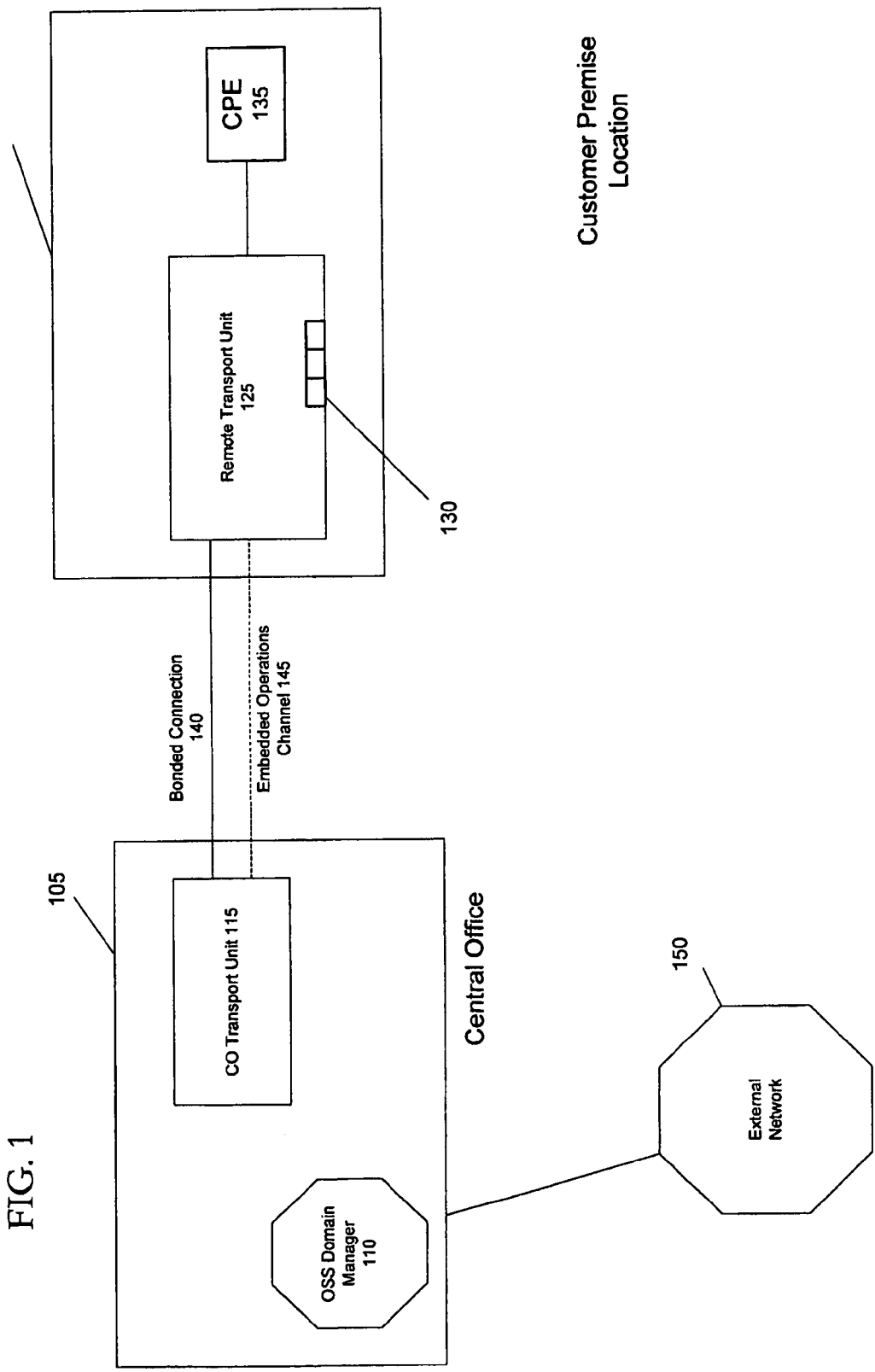
FIG. 1 is an embodiment of a system for secure management of customer premise equipment in a communication network.

A more complete understanding of the method, system, and apparatus of the principles of the present invention may be obtained by reference to the following Detailed Description when taken in conjunction with the accompanying Drawings wherein:

FIG. 1 is an embodiment of a system for secure management of customer premise equipment in a communication network. The communication network 100 includes a central office (CO) 105 having an operations support systems (OSS) domain manager 110 coupled to a central office transport unit 115. The OSS domain manager 110 includes software and/or hardware that allow a user or operator to perform management functions for the communication network 100. Examples of management functions performed by the OSS domain manager 110 include maintaining network inventory, provisioning services, configuring network elements, and managing faults. The CO 105 is coupled to an external network 150. In at least one embodiment, the external network 150 is the Internet. The central office transport unit 115 is further coupled to a remote transport unit 125 located at a customer premise location 120 via a bonded connection 140. In at least one embodiment, the bonded connection 140 is an Ethernet connection. In other embodiments, the bonded connection 140 is time-domain multiplexed (TDM) connection.

The central office transport unit 115 and the remote transport unit 125 are each configurable to support bonding of multiple copper pairs to provide one or more customers with a broadband connection using the bonded connection 140. In at least one embodiment, the bonded connection 140 is formed of a plurality of copper pairs that are bonded together to form a higher bandwidth connection. Copper bonding is a copper-based broadband system that allows broadband data services to be provided to customers without requiring replacement of an existing copper wire plant between the central office (CO) 105 and the customer premise location 120. Bonding of copper pairs is performed by combining multiples of existing copper wire pairs together to form one or more higher bandwidth connections capable of supporting greater data rates than that provided by a single copper pair. For example, in one embodiment two copper wire pairs are bonded to form a T1 connection capable of supporting data rates of up to 1.544 Mbits per second. In another embodiment, still more copper pairs are bonded together to form a connection capable of supporting T3 data rates of up to 44.736 Mbits per second. The central office transport unit 115 and the remote transport unit 125 are operable to modulate and multiplex/demultiplex communication signals over one or more bonded copper pairs. In a particular embodiment, the central office transport unit 115 and the remote transport unit 125 are transport units of the AK3000 or AK4000 family of copper bonding solution products produced by Aktino, Inc.

The remote transport unit 125 includes one or more external management ports 130. In an example embodiment, the external management ports 130 include a 9-pin male D-sub async craft port, a 9-pin male D-sub async craft rear port, and a rear Ethernet management port. The external management ports 130 are configured to provide a hardware interface with equipment that allows a craftsman, such as a technician, to access OSS management functions of the remote transport unit 125. The remote transport unit 125 is further coupled to customer premise equipment (CPE) 135 at the customer premise location 120. In at least one embodiment, the remote transport unit 125 is contained within a secured remote cabinet at the customer premise location 120. In an example embodiment, the secured remote cabinet is locked and alarmed to aid in preventing unauthorized access to the remote transport unit 125. The central office transport unit 115 and the remote transport unit 125 are configured to provide the customer premise equipment 135 with broadband access to the external network 150 through the bonded connection 140.

The bonded connection 140 includes an embedded operations channel 145. The embedded operations channel is a dedicated channel provided within the bonded connection 140 used to support administration and maintenance of elements in the communication network 100. In at least one embodiment, the embedded operations channel 145 is an out-of-band connection. The remote transport unit 125 and the central office transport unit 115 communicate customer data using a data plane and communicate management related information using a management plane. The data plane is a logical entity in which all customer application traffic within a network is carried. Examples of customer traffic include traffic generated by hosts, clients, servers, and applications. The management plane is a logical entity that carries management information traffic within a network that is used to access, manage, and monitor the network elements within a network. The management plane supports all of the required provisioning, maintenance, and performance monitoring functions for the network. In various embodiments of the invention, the data plane and management plane are completely isolated from one another such that the management plane is not reachable by customer traffic on the data plane. In an example embodiment, an isolated Internet Protocol (IP) stack is used exclusively for the management plane so that no data can be routed, bridged, or relayed from the data plane to the management plane. The isolated IP stack used for the management plane shares no tables, routes, or any data with the data plane.

In accordance with various embodiments, a secure connection between the central office transport unit 115 and the remote transport unit 125 is established over the embedded operations channel 145 to communicate management information between the central office transport unit 115 and the remote transport unit 125. The secure connection allows a service provider to deter unauthorized access to the management plane. In an at least one embodiment, a secure terminal protocol such as Secure Shell (SSH) is used to establish the secure connection between the central office transport unit 115 and the remote transport unit 125 over the embedded operations channel 145. SSH is a network protocol that allows data to be exchanged over a secure channel between two devices. In various embodiments, SSH is used to establish a secure channel over the embedded operations channel 145 between the central office transport unit 115 and the remote transport unit 125. Encryption, such as public-key cryptography, is used to provide confidentiality and integrity of data between the central office transport unit 115 and the remote transport unit 125.

In an example embodiment, SSH is used by an operator at the CO 105 to log into the remote transport unit 125 and execute commands to perform management functions, such as monitoring, provisioning, or configuring the remote transport unit 125. In at least one embodiment, SSH is further configured to transfer configuration files from the central office transport unit 115 to the remote transport unit 125 using an associated secure file transfer protocol (SFTP) or secure copy protocol (SCP). In at least one embodiment of the invention, the operator at the CO 105 must enter a valid user name and password into a terminal program to establish the secure connection between the central office transport unit 115 and the remote transport unit 125. In still other embodiments, a correct IP address of the remote transport unit 125 must also be entered before the secure connection can be established.

Once the secure connection is established, the operator at the CO 105 can instruct the remote transport unit 125 to execute a variety of management functions. In at least one embodiment, the operator at the CO 105 can instruct the remote transport unit 125, using the secure connection, to close the external management ports 130 such that these ports cannot be accessed by an unauthorized person at the customer premise location 120. If it is desired to allow a craftsman to access the external management ports 130 of the remote transport unit 125 at the customer premise location 120, the operator at the CO 105 can instruct the remote transport unit 125 to open the external management ports 130.

Figure 2:
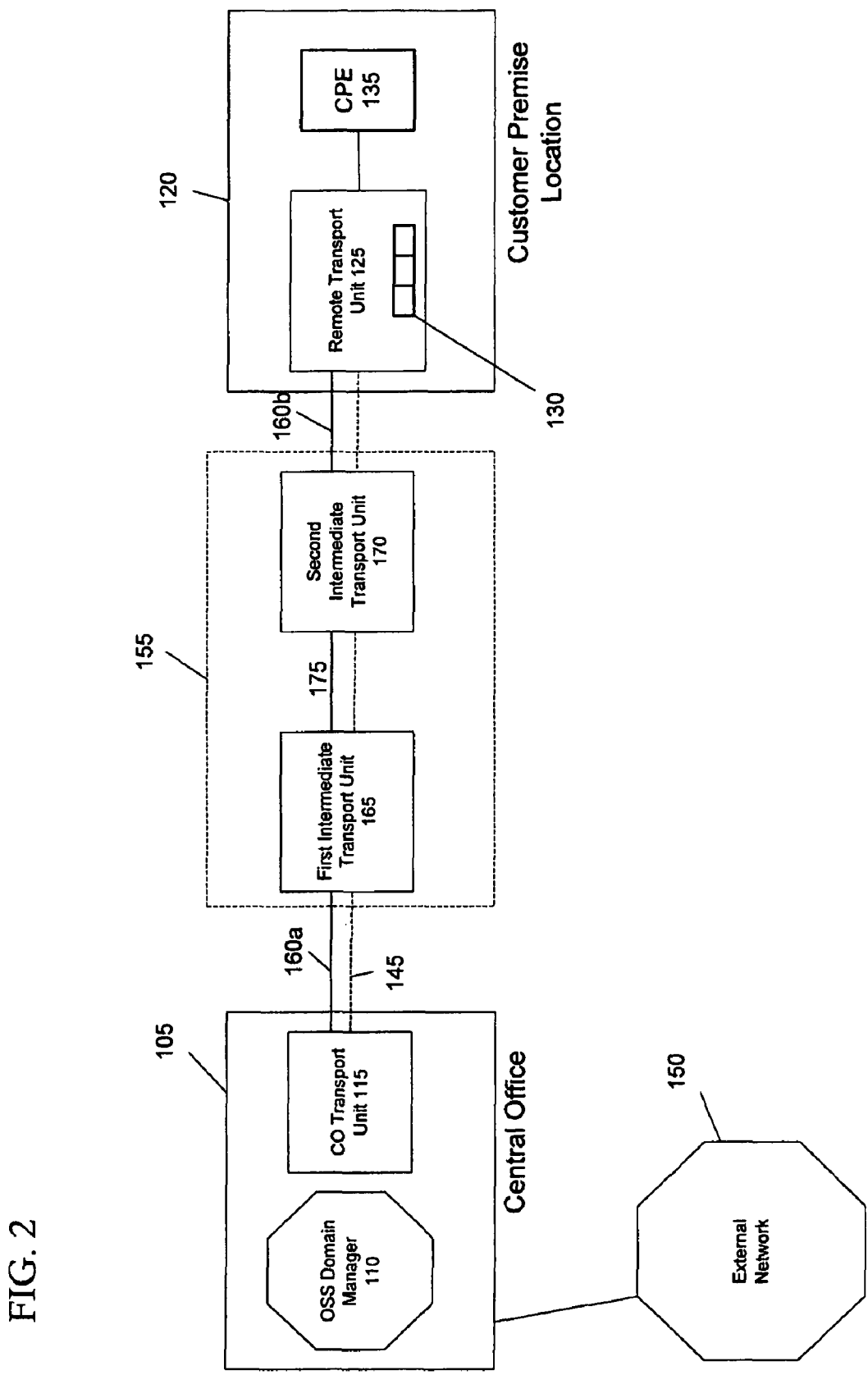
FIG. 2 is another embodiment of a system for secure management of customer premise equipment in a communication network.

FIG. 2 is another embodiment of a system for secure management of customer premise equipment in a communication network. The communication network 200 includes central office (CO) 105, OSS domain manager 110, central office transport unit 115, customer premise location 120, remote transport unit 125, customer premise equipment 135, and external network 150 as described with respect to FIG. 1. In the embodiment illustrated in FIG. 2, the distance between the CO 105 and customer premise location 120 is too great to allow the use of a single bonded connection. The embodiment illustrated in FIG. 2 further includes an intermediate location 155 having a first intermediate transport unit 165 coupled to a second intermediate transport unit 170 via a intermediate connection 175. The central office transport unit 115 is coupled to the first intermediate transport unit 165 by a first bonded connection 160*a*. The second intermediate transport unit 170 is coupled to the remote transport unit 125 by a second bonded connection 160b. The first intermediate transport unit 165 and the second intermediate transport unit 170 are operable to couple the first bonded connection 160a to the second bonded connection 160b to form an extended bonded connection. The first bonded connection 160a, intermediate connection 175, and second bonded connection 160b include an embedded operations channel 145. In accordance with various embodiments, the extended bonded connection allows a secure connection to be established between the central office transport unit 115 and the remote transport unit 125 over the embedded operations channel 145 to communicate management information between the central office transport unit 115 and the remote transport unit 125.

Figure 3:
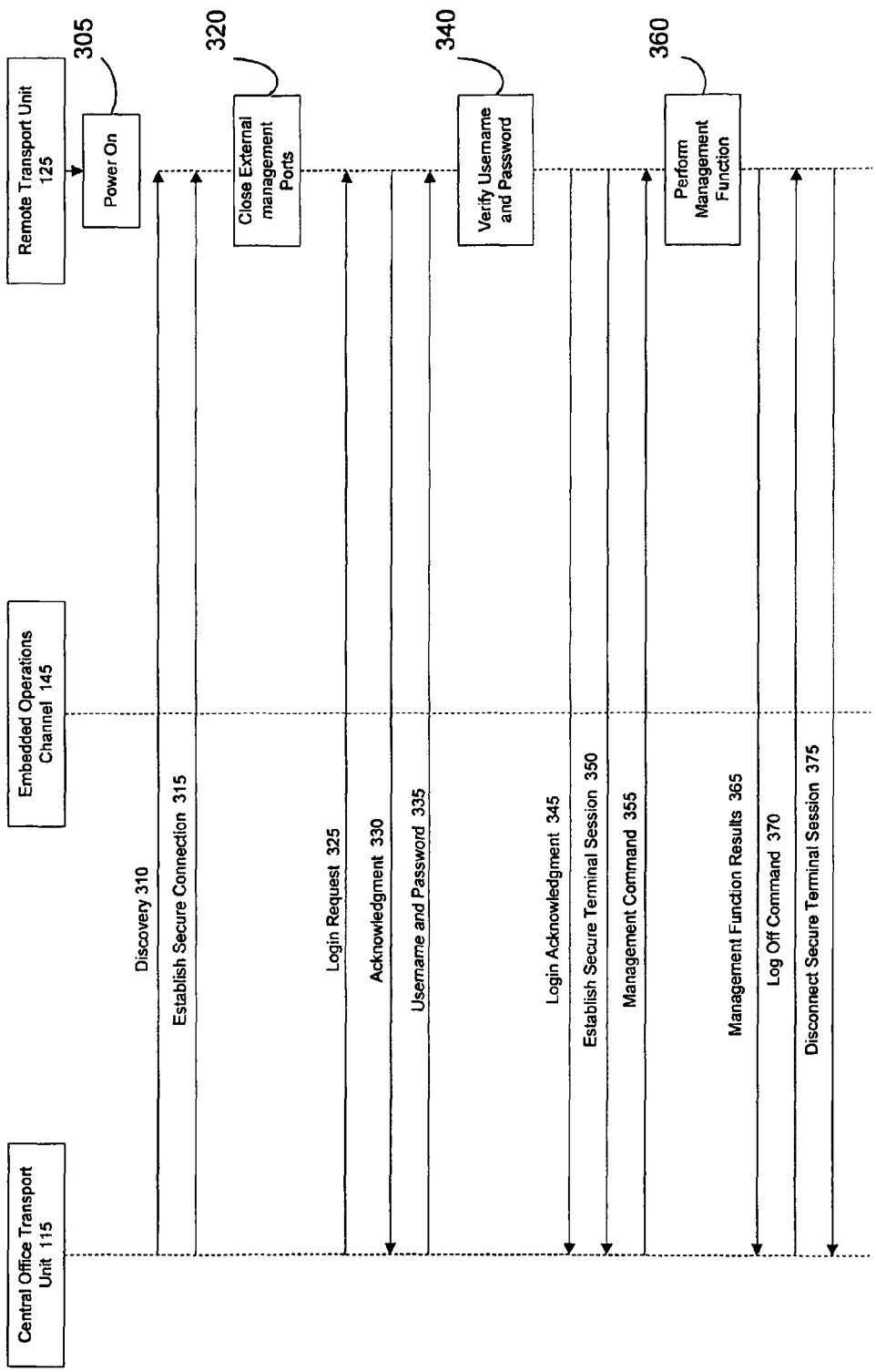
FIG. 3 is an embodiment of a procedure for secure management of customer premise equipment in a communication network.

FIG. 3 is an embodiment of a procedure 300 for secure management of customer premise equipment in a communication network. In the embodiment illustrated by FIG. 3 the remote transport unit 125 is installed at the customer premise location 120 by an installing technician or craftsman. In step 305, the remote transport unit 125 is powered on. In step 310, a discovery process is performed between the central office transport unit 115 and the remote transport unit 125 over the embedded operations channel 145 in order to make the central office transport unit 115 aware of the existence of the remote transport unit 125. In at least one embodiment, the discovery process is performed by the remote transport unit 125 sending a discovery request to the central office transport unit 115, and the central office transport unit 115 replying with an acknowledgment. In still another embodiment, the discovery process is performed by the central office transport unit 115 periodically sending a discovery request over the embedded operations channel 145 and the remote transport unit 125 responding with an acknowledgment. In step 315, a secure connection is established between the central office transport unit 115 and the remote transport unit 125 over the embedded operations channel 145. In step 320, the remote transport unit 125 closes all external management ports 130 such that these ports cannot be accessed by an unauthorized person at the customer premise location 120.

In step 325, a user at the CO 105 sends a login request, including a destination address associated with the remote transport unit 125, through the central office transport unit 115 to the remote transport unit 125. In at least one embodiment, the destination address associated with the remote transport unit 125 is an Internet Protocol (IP) destination address. The login request includes a request for access to the remote transport unit 125 by the central office transport unit 115. In some embodiments, the user sends the login request using a terminal program, for example, telnet. In step 330, the remote transport unit 125 sends an acknowledgement to the central office transport unit 115 which prompts the user at the CO 105 to enter a username and password. In step 335, the user at the CO 105 enters a username and password, and the username and password are sent to the remote transport unit 125. In step 340, the remote transport unit 125 verifies that the username and password are valid. If the username and password are valid, the remote transport unit 125 sends a login acknowledgment to the central office transport unit 115 granting access to the remote transport unit 125 in step 345. Otherwise the remote transport unit 125 refuses the login attempt. After the central office transport unit 115 receives the login acknowledgment, a secure terminal session is established between the central office transport unit 115 and the remote transport unit 125 using the embedded operations channel 145. In an at least one embodiment, a secure terminal protocol such as Secure Shell (SSH) is used to establish the secure terminal session between the central office transport unit 115 and the remote transport unit 125.

In step 355, the user at the CO 105 sends a management command through the central office transport unit 115 to the remote transport unit 125. The management command is operable to cause the remote transport unit 125 to perform management functions, such as monitoring and/or configuring the remote transport unit 125. In step 360, the remote transport unit 125 performs the management function indicated by the management command. In at least one embodiment, the management function instructs the remote transport unit 125 to open the external management ports 130 so that they can be accessed by an authorized person at the customer premise location 120. In step 365, the remote transport unit 125 sends the results of the management function to the central office transport unit 115. In step 370, the user at the CO 105 sends a log off command to the remote transport unit 125 through the central office transport unit 115. The secure terminal session between the central office transport unit 115 and the remote transport unit 125 is disconnected in step 375.

In at least one embodiment, the remote transport unit 125 includes non-volatile memory such that all security features and configuration settings of the remote transport unit 125 are retained if a power loss occurs. For example, if the external management ports 130 are closed at the time of power loss, the external management ports 130 remain closed when power loss is restored. In some embodiments, the remote transport unit 125 is provided with the capability of signaling to a field technician or craftsman to indicate the security status of the remote transport unit 125.

Although the embodiments illustrated in FIGS. 1-3 are directed to a central office transport unit 115 located at the CO 105, it should be understood that in other embodiments a transport unit having the capabilities of the central office transport unit 115 is located in a remote cabinet away from the CO 105. In such an embodiment, the transport unit in the remote cabinet is further provided with connectivity to the CO 105 so that an operator at the central office can access the transport unit and issue management commands to the remote transport unit 125.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device. In various embodiments, the remote transport unit 125 includes one or more processors operable to execute computer executable instructions to perform the various capabilities of the remote transport unit 125 described herein. Similarly, the central office transport unit 115 includes one or more processors operable to execute computer executable instructions to perform the various capabilities of the central office transport unit 115 described herein.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/w) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The previous detailed description is of a small number of embodiments for implementing the invention and is not intended to be limiting in scope. One of skill in this art will immediately envisage the methods and variations used to implement this invention in other areas than those described in detail. For example, although the described embodiments are directed to deep packet inspection and modification of acknowledgement packets being performed at an intermediate network node, it should be understood that these procedures may be performed at any node within the network. Although some particular embodiments are described with respect to using a TCP transport layer, it should be understood that the principles described herein may be used with any transport layer connection regardless of the particular network configuration or technologies used. The following claims set forth a number of the embodiments of the invention disclosed with greater particularity.

What is claimed as new and desired to be protected by Letters Patent of the United States is:

1. A method for managing customer premise equipment comprising:
    establishing a secure connection between a first transport unit and a second transport unit, the secure connection including an embedded operations channel, the secure connection operable to isolate a management plane from a data plane, wherein the first transport unit is located at a customer premise location and the second transport unit is located at a central office;
    receiving, at the first transport unit, a request for access to the first transport unit from the second transport unit;
    establishing a secure terminal session between the first transport unit and the second transport unit using the embedded operations channel in response to receiving the request for access;
    receiving, at the first transport unit, a management command from the second transport unit; and
    performing, by the first transport unit, at least one management function in response to receiving the management command.

2. The method of claim 1, wherein establishing the secure terminal session includes receiving at least one of a username and a password from the second transport unit.

3. The method of claim 1, wherein the secure connection comprises a bonding of a plurality of copper pairs.

4. The method of claim 1, wherein the second transport unit is located at a central office.

5. The method of claim 1, wherein the at least one management function comprises at least one of monitoring, provisioning, and configuring the first transport unit.

6. A first transport unit comprising:
    at least one processor, the at least one processor operable to:
        establish a secure connection with a second transport unit, the secure connection including an embedded operations channel, the secure connection operable to isolate a management plane from a data plane, wherein the first transport unit is located at a customer premise location and the second transport unit is located at a central office;
        receive a request for access from the second transport unit;
        establish a secure terminal session between the first transport unit and the second transport unit using the embedded operations channel in response to receiving the request for access;
        receive a management command from the second transport unit; and
        perform at least one management function in response to receiving the management command.

7. The first transport unit of claim 6, wherein establishing the secure terminal session includes receiving at least one of a username and a password from the second transport unit.

8. The first transport unit of claim 6, wherein the secure connection comprises a bonding of a plurality of copper pairs.

9. The first transport unit of claim 6, wherein the at least one processor is further operable to send results of the management function to the second transport unit.

10. The first transport unit of claim 6, wherein the at least one management function comprises at least one of monitoring, provisioning, and configuring the first transport unit.

11. A computer usable program product in a non-transitory computer readable medium storing computer executable instructions for managing customer premise equipment that, when executed, cause at least one processor to:
    establish a secure connection between the first transport unit and a second transport unit, the secure connection including an embedded operations channel, the secure connection operable to isolate a management plane from a data plane, wherein the first transport unit is located at a customer premise location and the second transport unit is located at a central office;
    receive, at the first transport unit, a request for access to the first transport unit from the second transport unit;
    establish a secure terminal session between the first transport unit and the second transport unit using the embedded operations channel in response to receiving the request for access;
    receive, at the first transport unit, a management command from the second transport unit; and
    perform, by the first transport unit, at least one management function in response to receiving the management command.

12. The computer usable program product of claim 11, wherein establishing the secure terminal session includes receiving at least one of a username and a password from the second transport unit.

13. The computer usable program product of claim 11, wherein the secure connection comprises a bonding of a plurality of copper pairs.

14. The computer usable program product of claim 11, wherein the computer executable instructions further cause the at least one processor to send results of the management function to the second transport unit.

15. The computer usable program product of claim 11, wherein the at least one management function comprises at least one of monitoring, provisioning, and configuring the first transport unit.

* * * * *